United States Patent Office 3,526,581
Patented Sept. 1, 1970

3,526,581
PREPARATION OF DIOLS AND HYDROXY ETHERS
Eddie C. French, Ponca City, Okla., assignor to Continental Oil Company, Ponca City, Okla., a corporation of Delaware
No Drawing. Filed Mar. 30, 1967, Ser. No. 626,987
Int. Cl. C07c *43/04*
U.S. Cl. 204—77      3 Claims

ABSTRACT OF THE DISCLOSURE

α,β-Unsaturated aldehydes are simultaneously electrochemically reduced and either hydrated or alcoholated to a 1,3-diol or to a 1-hydroxy, 3-alkoxy, depending on the absence or presence of an alcohol in the catholyte; both the anolyte and the catholyte of the divided cell contain bicarbonate ions.

---

This invention relates to preparation of 3-alkoxy and 3-hydroxy alcohols electrochemically from α,β-unsaturated aldehydes.

Various methods have been proposed in the past for preparation of diols and hydroxy ethers. These methods have all suffered one or more shortcomings and, so far as is known, these compounds have not as yet been produced electrochemically on a commercial scale in spite of the known advantages of electrochemical methods, such as selectivity and reproducibility.

I have now discovered that α,β-unsaturated aldehydes, i.e. compounds of the general formula

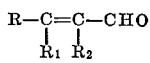

can be electrochemically converted to 3-alkoxy or 3-hydroxy alcohols, depending on the presence or absence of an alcohol in the catholyte. My invention is effected in a divided cell, as known in the art, that is, one in which the anolyte and the catholyte are physically separated by a permeable or porous membrane. Further, I have discovered that the pH of the catholyte solution should be maintained between about 7.5 and about 8.5 in order to prevent polymerization of the starting materials. This can be done effectively by providing a buffering compound in the catholyte, a suitable buffer being bicarbonate ions, as provided, e.g. by a solution of sodium or potassium bicarbonate.

The products of my invention are characterized by the general formula

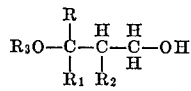

wherein each of the R's is hydrogen or a hydrocarbon radical. It can be seen that when $R_3$ is hydrogen, the product is a 1,3-diol, and when $R_3$ is a hydrocarbon radical, the product is a hydroxy ether. The —$OR_3$ group derives from the alcohol present in the catholyte, if any; thus, if methanol is used in the catholyte, this group will be methoxy, etc. In the absence of alcohol in the catholyte, the —$OR_3$ group derives from water therein, and is hydroxy. The only limitation as to size of any of the "R" groups is solubility of the reactants in water. Thus, any of the four "R" groups of the two starting materials can be alkyl, aryl, or cycloalkyl, the criterion being that each of the two starting materials is to some extent water-soluble. As a practical matter, this limits the number of carbons in each starting material to at most about nine, although it will be recognized that solubility in water will depend not only on the types of functional groups present, but also on their locations within the molecule.

Suitable α,β-unsaturated aldehydes include propenal (acrolein), α-methyl propenal, β-methyl propenal, α-i-amyl propenal, β-phenyl propenal (cinnamaldehyde), β-cyclopentyl propenal, β-(2-methyl cyclobutyl) propenal, and α,β,β-triethyl propenal. Suitable alcohols for use in preparation of the hydroxy ether species of this invention include methanol, i-propanol, phenol, m-ethyl phenol, n-nonanol, cyclohexanol, and 2-phenyl ethanol.

The process of this invention is preferably effected at ambient conditions of pressure and temperature, although either or both of these variables can be raised or lowered for reasons of, e.g., solubility.

As stated previously, the divided cell electrolysis apparatus is well known in the art, and as such forms no part of this invention. In such cells, the anolyte is separated from the catholyte by a porous barrier, such as a fine-glass frit or porous earthenware. Separation of the two electrodes in such manner is necessary to prevent oxidation of the starting aldehyde at the anode. The cathode used for the present invention is also not critical, any high hydrogen overvoltage electrode such as, e.g., zinc, tin, mercury, lead, etc. being suitable. The anode can be any suitable inert electrode, such as, e.g., platinum.

The electrolyte solutions of the present invention merit further consideration. The catholyte comprises an aqueous solution of the unsaturated aldehyde starting material and, in the instance of preparing hydroxy ethers, contains also the appropriate alcohol in solution. Concentration of these two starting materials in the catholyte is not critical. In order to prevent the catholyte pH from drifting by formation of hydroxyl ions during the course of the process, and thus allowing polymerization of the starting aldehyde, the catholyte is buffered, preferably so as to maintain its pH between about 7.5 and about 8.5. This can be conveniently effected by maintaining an excess of bicarbonate ions in the catholyte, such as by addition of a soluble bicarbonate, e.g., sodium or potassium bicarbonate. The anolyte can conveniently also comprise a saturated bicarbonate solution.

It has also been discovered that the best cell efficiency is obtained when the current density in the catholyte is maintained between about 5 and about 60 milliamperes per square centimeter.

Further understanding of this invention will be gained by study of the following examples.

EXAMPLE 1

A dual-compartment electrolysis cell in which the compartments were divided by a fine-glass frit was used. The anode was platinum, and the cathode was zinc. The anolyte was a saturated solution of potassium bicarbonate. The catholyte was an aqueous solution containing 20 weight percent acrolein and 20 weight percent potassium bicarbonate. Yields of 1,3-propanediol are tabulated below for runs in which different current densities were used and from which differing current efficiencies were obtained.

| Percent 1,3-propanediol based on acrolein charged | Current density, ma./cm.² | Current efficiency, percent |
|---|---|---|
| 45 | 10 | 3 |
| 61 | 20 | 14 |
| 57 | 40 | 18 |
| 65 | 40 | 19 |
| 59 | 50 | 13 |
| 68 | 50 | 14 |
| 55 | 60 | 5 |

EXAMPLE 2

The apparatus and procedure of Example 1 were used, except that there was added to the catholyte 20 weight percent methanol. At a current density of 10 ma./cm.², there was obtained 29 weight percent, based on the acrolein charged, of 3-methoxy-n-propanol. Current efficiency was 25 percent.

In an experiment similar to that of Example 1 but wherein the acrolein in the catholyte was replaced by methylvinyl ketone, the product was the dimer, 2,7-octanedione. Thus, it was unexpected that the procedure of the present invention could avoid dimerization through the unsaturated bond in the charge aldehyde. The products of the present invention are useful as freezing point depressants and as intermediates for organic synthesis.

Having thus described the invention by providing specific examples thereof, it is to be understood that no undue limitations or restrictions are to be drawn by reason thereof and that many variations and modifications are within the scope of the invention.

What is claimed is:

1. The method of preparing a compound of the formula

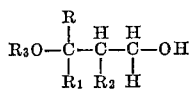

which comprises subjecting to a direct electrical current an anolyte comprising bicarbonate ions in aqueous solution and, in electrical communication therewith, a catholyte comprising an aqueous solution of bicarbonate ions and compounds of the formula

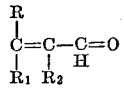

and $R_3OH$, wherein R, $R_1$, and $R_2$ are all selected from the group consisting of hydrogen, alkyl, and aryl and $R_3$ is selected from the group consisting of alkyl and aryl wherein $R_3$ contains at most about nine carbon atoms, and wherein the total number of carbon atoms in R, $R_1$, and $R_2$ is at most about six.

2. The method of claim 1 wherein the density of said direct electrical current is between about 5 and about 60 milliamperes per square centimeter in said catholyte.

3. The method of claim 1 wherein R, $R_1$, and $R_2$ are hydrogen and $R_3$ is methyl.

References Cited

UNITED STATES PATENTS 2,462,301   2/1949   Bludworth et al. _____ 204—77

PATRICK P. GARVIN, Primary Examiner